United States Patent
Kamath et al.

(10) Patent No.: US 8,335,180 B1
(45) Date of Patent: Dec. 18, 2012

(54) METHOD AND APPARATUS FOR SYNCHRONIZING AND/OR STARTING ACCESS POINTS FOR ADAPTIVE TIME DIVISION MULTIPLEXING ON A MULTI-CHANNEL WIRELINE MEDIUM WITH COLOCATED TRANSCEIVERS

(75) Inventors: Purushotham Kamath, San Jose, CA (US); James S. Cho, Mountain View, CA (US); Prem Kumar, Saratoga, CA (US); Matthew Smith, San Jose, CA (US); Haixiang Liang, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1014 days.

(21) Appl. No.: 12/248,852

(22) Filed: Oct. 9, 2008

Related U.S. Application Data (63) Continuation-in-part of application No. 12/118,635, filed on May 9, 2008.

(51) Int. Cl.
*H04B 7/212* (2006.01)
*H04J 3/00* (2006.01)
*H04J 3/06* (2006.01)
(52) U.S. Cl. .................. 370/324; 370/337; 370/350
(58) Field of Classification Search .............. 370/324
See application file for complete search history.

(56) References Cited

U.S. PATENT DOCUMENTS

| | | | |
|---|---|---|---|
| 6,014,385 A | 1/2000 | Ayanoglu et al. | |
| 6,087,878 A * | 7/2000 | Suzuki et al. | 327/319 |
| 6,097,707 A * | 8/2000 | Hodzic et al. | 370/321 |
| 7,167,717 B1 * | 1/2007 | Goren | 455/502 |
| 2002/0071413 A1 | 6/2002 | Choi | |
| 2003/0114153 A1 | 6/2003 | Shaver et al. | |
| 2004/0114563 A1 | 6/2004 | Shvodian | |
| 2004/0131039 A1 | 7/2004 | Benveniste | |
| 2005/0271010 A1 * | 12/2005 | Capretta | 370/329 |
| 2007/0161364 A1 | 7/2007 | Surineni et al. | |
| 2007/0220062 A1 * | 9/2007 | Carberry et al. | 707/201 |
| 2007/0233776 A1 | 10/2007 | Palm | |
| 2008/0098133 A1 * | 4/2008 | Shaanan et al. | 710/30 |
| 2009/0279565 A1 | 11/2009 | Kamath et al. | |

* cited by examiner

*Primary Examiner* — Derrick Ferris
*Assistant Examiner* — Kodzovi Acolatse
(74) *Attorney, Agent, or Firm* — Mahamedi Paradice Kreisman LLP

(57) ABSTRACT

Starting up and synchronizing multiple access points in a wireline communications circuit using transceivers compatible with a wireless communications protocol with an adaptive Time Division Multiple Access scheme for a multi-channel medium with colocated transceivers. Synchronization readiness is asserted and the access points wait for a synchronization start signal's assertion. Methods of operating an access point, its implementation as a chip are further disclosed. An access point assembly including the access points and a synchronization circuit are also disclosed.

19 Claims, 10 Drawing Sheets

Time used in increments of Time steps

METHOD AND APPARATUS FOR SYNCHRONIZING AND/OR STARTING ACCESS POINTS FOR ADAPTIVE TIME DIVISION MULTIPLEXING ON A MULTI-CHANNEL WIRELINE MEDIUM WITH COLOCATED TRANSCEIVERS

CROSS REFERENCE TO RELATED PATENT APPLICATIONS

This patent application is a continuation in part of U.S. patent application Ser. No. 12/118,635, filed May 9, 2008, which is incorporated herein in its entirety.

TECHNICAL FIELD

This invention relates to the operation of access points using colocated transceivers in a multi-channel wireline medium such as a coaxial cable.

BACKGROUND OF THE INVENTION

This patent application focuses on the operation and use of colocated transceivers using a multi-channel wireline physical media such as coaxial cable where the frequency separation between channels may be relatively small. The typical example would be the use of colocated transceivers designed for wireless networks, on a coaxial medium using a wireless channel allocation scheme where adjacent channel separation is small. This is not a well-explored technical area. The problems to be discussed are not well known as of the time of filing this and its parent patent application.

The problems of time division multiple access techniques on a multi channel wireline network with colocated transceivers with relatively little channel separation and transceivers favored by wireless network standards are not well known as of the time of filing this and its parent patent application. Operating the access points using these colocated transceivers has two problems in addition to the general communication problems discussed in the parent application, how to synchronize multiple access point transmissions and how to turn on or restart the access points.

SUMMARY OF THE INVENTION

Embodiments of this invention include an access assembly including access points in a wireline communications circuit each presenting a synchronization ready signal to a synchronizing circuit that produces a synchronization start signal received by all of the access points. The synchronization start signal is asserted in response to each of the synchronization ready signals being asserted. When the assertion of the synchronization start signal's, each of the access point may preferably begins its adaptive Time Division Multiple Access (TDMA) cycle during which its synchronization ready signal is no longer asserted.

Further, each of the access points preferably starts up by asserting its synchronization ready signal and waiting for the synchronization start signal to be asserted before iteratively transmitting and receiving its TDMA cycle, then asserting the synchronization ready signal and waiting for the synchronization start signal's assertion before again transmitting and receiving its TDMA cycle.

As used herein, a wireline communications circuit will support at least two access points and at least two stations communicating across a wireline medium using transceivers. The access points may be "colocated", i.e., the distance between the access points may be small when compared to the distance between the access points (APs) and the stations (STAs). Each access point may communicate with one or more of the stations and each station may communicate with a single access point. The communication between an access point and its stations uses a frequency band referred to herein as a channel. Each access point uses a separate channel to communicate with its stations. The frequency separation between channels may be small. The wireline medium may include, but is not limited to at least one of the following: a coaxial cable, a fiber optic cable and a twisted pair cable. The transceivers may comply with a wireless protocol that may include a version of the IEEE 802.11 communications standard.

An adaptive TDMA protocol solves the following problems for the wireline communication circuit: If one access point transmits while another access point receives, its transmission interferes with the other access point's reception, the receiver's front end may need to handle unusually strong signals, often making it insensitive to the weaker signals it is trying to receive. This problem may occur because the access points are colocated. Also, the STAs may not need to transmit or receive at a constant rate. For example, Internet access tends to be in bursts for both uplink and downlink. A second problem is the waste of bandwidth in a fixed uplink-downlink scheme when no station needs an uplink frame. And a third problem is the bandwidth waste when the access point has no downlink frame to transmit to a station.

Embodiments of the invention include the access point assembly, a method of operating the access point, an integrated circuit (chip) implementing the access point component, and a chip that may implement either the access point or the station component.

BRIEF DESCRIPTION OF THE DRAWINGS

FIGS. 2A and 2B show state diagrams of each of the access points of FIG. 1 with the startup state leading to looping between waiting for the assertion of the synchronization start signal followed by the Time Division Multiple Access (TDMA) cycle, followed by again waiting and so on.

In FIG. 14A, the synchronizing circuit may include a pullup resistor with each of the synchronization ready signals being asserted as a high impedance state. In FIG. 14B, the wireline communication circuit includes more than two access points, in particular three access points.

DETAILED DESCRIPTION

This invention relates to the use of wireless transceivers in a wireline medium such as a coaxial cable. A transceiver includes, but is not limited to, a transmitter and a receiver. A wireline communications circuit may support at least two access points and at least two stations communicating across a multi-channel wireline medium using transceivers compatible with a wireless protocol.

This description will begin by showing an example of the invention's wireline communication circuit using an adaptive Time Division Multiple Access (TDMA) protocol and configured to communicate synchronization ready signals to a synchronizing circuit that generates a synchronization start signal. The adaptive TDMA protocol is then discussed, scheduling uplinks and downlinks, and adapting to unused uplink frames and to unused downlink frames. Further preferred refinements will then be discussed, some of which include the synchronizing circuit implemented as a pull-up resistor, also the synchronizing circuit preferably communicating with each of the access points, which may number more than two.

Embodiments of the adaptive TDMA protocol may incorporate a reservation phase in the TDMA frame sequence, and/or bundle acknowledgements by units for their previously received frame when they next transmit, and/or the relinquishment of the remainder of an uplink frame by a client, known herein as a station.

Figure 1:
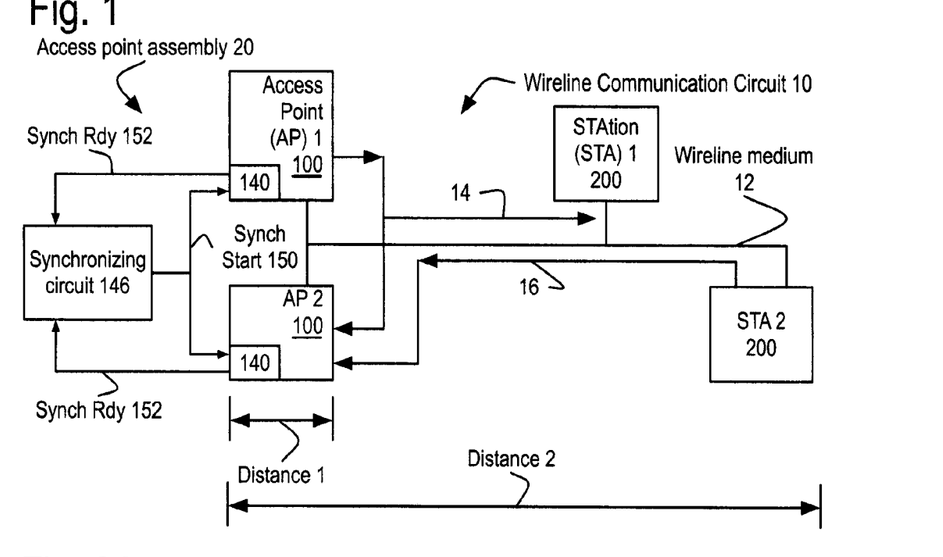
FIG. 1 shows a wireline communication circuit supporting at least two access points and at least two stations communicating across a wireline medium using transceivers compatible with a wireless protocol. An access point assembly may include the access points and a synchronization circuit receiving a synchronization ready signal from each of the access points and asserting a synchronization start signal in response to all of the synchronization ready signals being asserted.

Referring to the drawings more particularly by reference numbers, FIG. 1 shows a wireline communications circuit 10 supporting at least two access points 100 and at least two stations 200 communicating across a wireline medium 12 using transceivers compatible with a wireless protocol. The wireline communication circuit further includes an access point assembly 20 including the access points and a synchronization circuit 146 configured to receive a synchronization ready signal 152 from each of the access points 100 and configured to assert a synchronization start signal 150 in response to all of the synchronization ready signals being asserted.

Each access point 100 communicates on a separate channel. Channels may include separate portions of a frequency spectrum. For example, a first channel may use a frequency from 2.401 GHz to 2.423 GHz and a second channel may use a frequency from 2.426 GHz to 2.448 GHz. Each station 200 communicates with one of the access points. The wireline medium may include, but is not limited to at least one of the following: a coaxial cable, a fiber optic cable and/or a twisted pair cable. The wireless protocol may include a version of the IEEE 802.11 communications standard. In many implementations, the access points may be located within less than five meters shown as distance 1, and the stations may be as much as 300 meters distant from the access points as shown by distance 2.

Figure 2A:
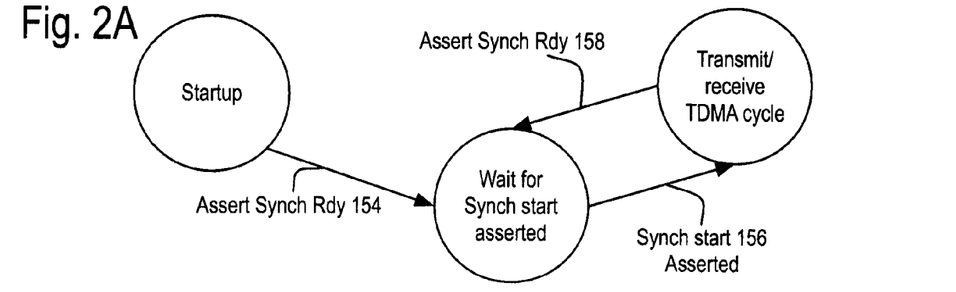

FIG. 2A shows a state diagram of each of the access points 100 with the startup state asserting 154 the synchronization ready signal 152 leading to waiting for the synchronization start signal 150 to be asserted 156, leading to the transmit and reception of an adaptive TDMA cycle, which when completed, is signaled by assertion 158 of the synchronization ready signal and a return to the waiting for the assertion of the synchronization start signal.

While this state diagram is straightforward, it has a liability, in that it assumes that the access points 100 all start up at about the same time. If they start up asynchronously, the synchronization start signal 150 may glitch, possibly damaging the synchronization of at least one of the access points.

Figure 2B:
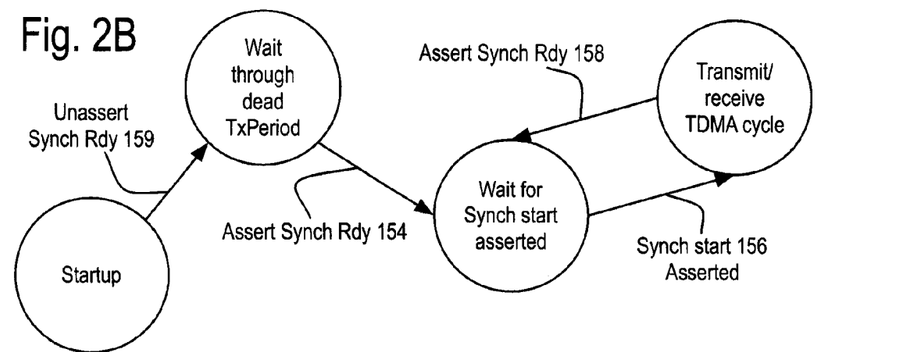

FIG. 2B shows a refinement of the state diagram of FIG. 2A. Startup begins by unasserting 159 the synchronization ready signal 152, followed by waiting through a dead TxPeriod of time, then proceeding as in FIG. 2A by asserting 154 the synchronization ready signal 152 leading to waiting for the synchronization start signal 150 to be asserted 156, leading to the transmit and reception of an adaptive TDMA cycle, which when completed, is signaled by assertion 158 of the synchronization ready signal and a return to the waiting for the assertion of the synchronization start signal. The TxPeriod is implementation dependent, but may be in the range of a few milliseconds for a specific implementation. In certain implementations, the TxPeriod may represent the duration of the TDMA cycle to be discussed in FIGS. 3A and 3B, which may vary from one cycle to the next. On startup, it may denote a predetermined period of time.

An alternative embodiment of the invention may include the synchronization circuit 146 delaying asserting the synchronization start signal 150 after all the synchronization ready signals 152 have been asserted for some time period. By way of example, the time period may be some number of milliseconds to some number of microseconds. In such embodiments, the state diagram of FIG. 2A may be preferred, whereas in other embodiments, the state diagram of FIG. 2B may be preferred.

Three problems have been found and discussed in the parent application in using wireless protocol transceivers in the wireline communications circuit 10. A first problem may occur when a first access point transmits using a first channel, while a second access point receives on a second channel. The first access point's transmission may interfere with the second access point's reception, in that the second access point's receiver front end may need to handle unusually strong signals, often making it insensitive to the weaker signals it may be trying to receive. This is particularly the case when the first and second channels are relatively close to together in frequency. An example of solutions to this problem are shown in FIGS. 3A and 3B as two organizations of frames in a TDMA protocol sequence.

Figure 4:
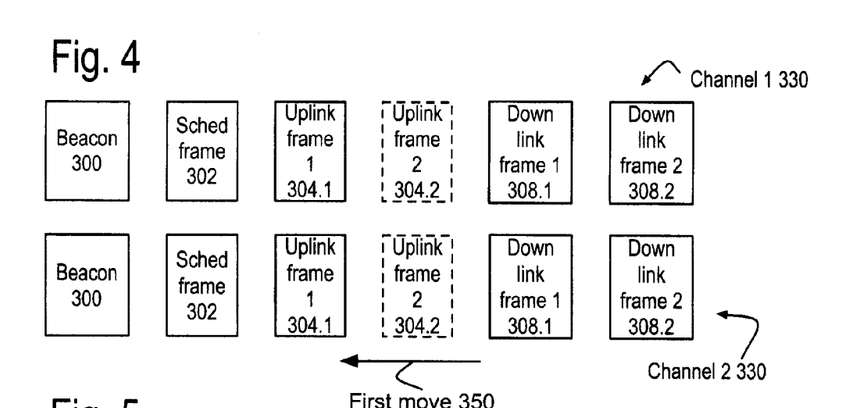
FIG. 4 shows an example of the problem of the wasting bandwidth on a frame not needed for any uplink operation, or upload and its solution by first moving successor frames forward to recover the wasted bandwidth as shown in FIG. 5.
Figure 5:
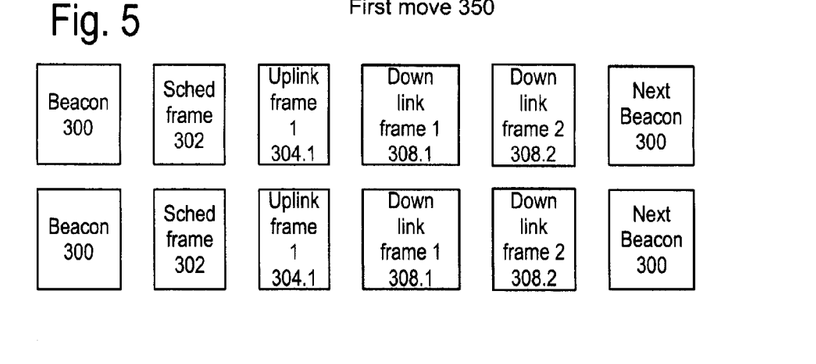
Figure 6:
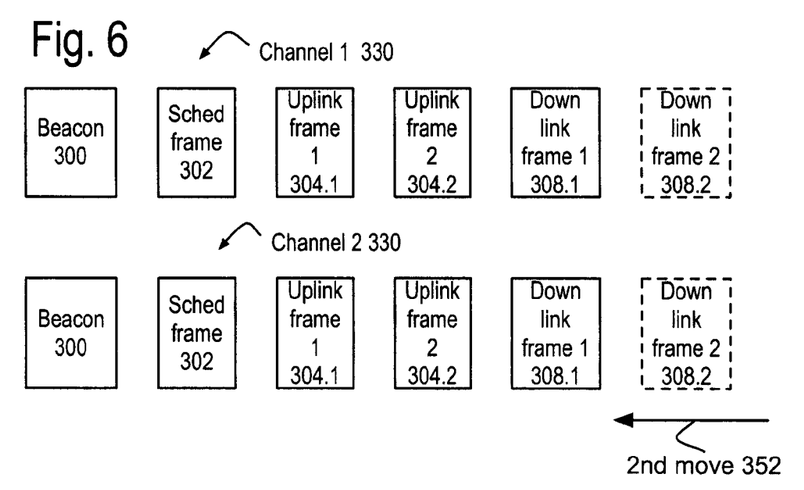
FIG. 6 shows an example of the problem of the wasting bandwidth on a frame not needed for any downlink operation, or download. The invention second moves successor time slots forward to recover the wasted bandwidth as shown in FIG. 7.
Figure 7:
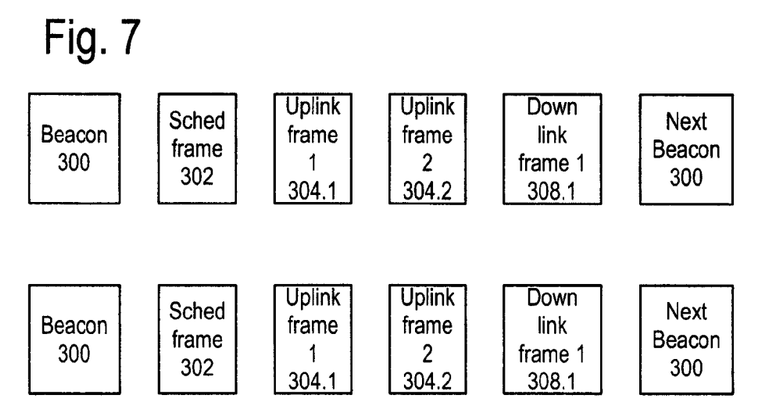

A TDMA protocol may provide a solution to the adjacent channel interference problem described above. However the TDMA schedule may need to be synchronized across colocated access points (i.e., access points sharing a wireline medium). Also, network access by the stations 200 may not be at a constant rate. For example, Internet access tends to be in bursts for both uplink and downlink operations, thus uplink and downlink operations may not be constant. A second problem is the waste of bandwidth in a fixed uplink-downlink scheme when no station needs an uplink frame as shown in FIG. 4. The bandwidth saving of the invention's solution to this problem is shown in FIG. 5. A third problem is the bandwidth waste when the access point has no downlink frame to transmit to a station as shown in FIG. 6. FIG. 7 shows the bandwidth saving of the invention's solution to the third problem.

An adaptive TDMA scheme solves all of these problems for the wireline communication circuit 10, insuring communication between the access points and the stations does not saturate front end receivers and saving bandwidth from inactive uplink or downlink frames.

Figure 3A:
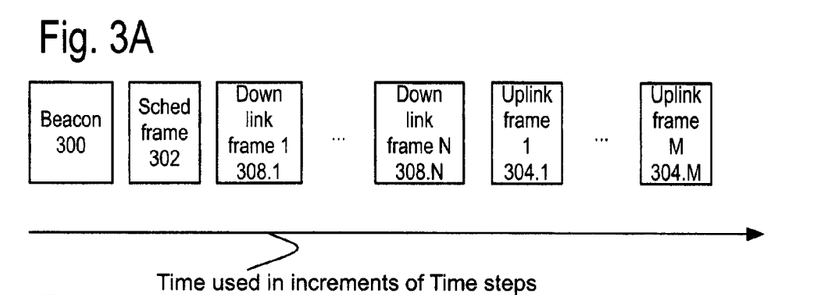
FIGS. 3A and 3B shows examples of adaptive TDMA cycles showing a beacon, scheduling frame, at least one uplink frame followed by at least one downlink frame. The adaptive TDMA cycle shown in FIG. 3A was disclosed in the parent application and the adaptive TDMA cycle shown in FIG. 3B reverses the order of uplink and downlink frames, and will be used in the remaining Figures. The invention may be used with either adaptive TDMA cycle.
Figure 3B:
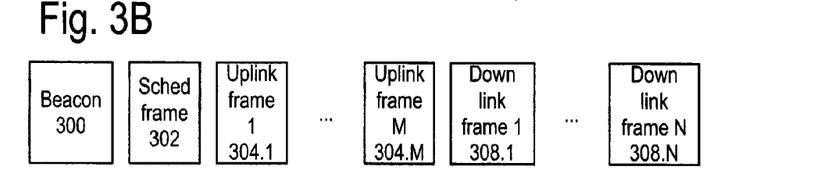

FIGS. 3A and 3B show frame diagrams for two time division multiple access protocols managing the communications between the access points 100 and stations 200 of the wireline communication circuit 10 of FIG. 1 that differ in that FIG. 3A shows downlink frames before the uplink frames, whereas FIG. 3B shows uplink frames before the downlink frames.

Typically, each access point 100 is assigned a channel $330_{[r1]}$ to which one or more stations 200 are clients. Each access point tends to be closely synchronized with other access points. A typical access cycle includes a beacon phase, an uplink data transfer phase and a downlink data transfer phase.

During the beacon phase, each access point broadcasts a beacon 300 and a schedule$_{[r2]}$ 303 in the synchronization frame 302 on its channel 330. The stations may use the beacon and the schedule to align their local clocking to their access point.

During the uplink data transfer phase, a station transmits its uplink frames, followed by a succession of other stations transmitting their respective uplink frames, each in its own respective uplink slot. The first uplink transmission takes place in the first uplink frame 304.1. The second uplink transmission in the second uplink frame 304.2, and so on. An uplink transmission frame may include data, an acknowledgement of previous data sent and/or a relinquish instruction. For example, an acknowledgement in frame 304.1 could confirm the reception of data sent by the AP during a previous access cycle. Uplink frames may include data and acknowledgement, acknowledgement and relinquish or just relinquish data. Relinquish frames and relinquish data are described in more detail in conjunction with FIGS. 4 and 21.

Similar to uplink data, during the downlink data transfer phase, the access point transmits a downlink transmission to the first station in the first downlink frame 308.1, a second downlink transmission to the second station in the second downlink frame 308.2, and so on.

However, network access by the stations 200 may not be at a constant rate. For example, Internet access tends to be in bursts for both upload and download.

FIG. 4 shows an example of a second problem with the wireline communication circuit 10, the waste of bandwidth in a fixed uplink-downlink scheme when no station needs an uplink frame. In these exemplary figures, it will be assumed that there are two access points 100, each servicing two stations 200 as clients on separate channels 330. These channels may be physical channels, say at different frequency bands. The invention's solution to this problem is to have the stations send "Relinquish" frames when they have no data to transmit. If the uplink data transfer phase ends sooner than specified in the schedule 303, the access points signal each other through an external means. In one embodiment, access points may signal each other though channel in use flags. When all access points have signaled that their uplink data transfer phase is complete, all access point may begin their downlink data transfer phase. FIG. 4 indicates the access points first move 350 successor frames forward, recovering the active use of the wasted uplink frame as shown in FIG. 5.

FIG. 5 shows the result of the first move 350 of the frames of both channels 330 of FIG. 4 forward when it is determined that no station needs the uplink frame 304.2. This adaptive time division multiplexing of the uplink frames saves the bandwidth that would otherwise be lost. The discussion of various alternatives for determining that a frame is not being used will be postponed till the various hardware embodiments.

FIG. 6 shows an example of a third problem with the wireline communication circuit 10, the waste of bandwidth waste when no station 200 needs a downlink frame 308.2, with the invention's solution being to have the every access point signal other access points through an external means. When all access points have signaled that their Downlink Data Transfer Phase is complete, all access points begin their next Beacon phase. The solution shows the access points second move 352 successor frames forward.

FIG. 7 shows the result of the second move of the frames of all of the channels 330 of FIG. 6 when it is determined that no station needs the downlink frame 308.2.

Using the adaptive TDMA scheme in the wireline communications circuit 10 solves these three problems. Embodiments of the invention include a method of operating an access point 100, an integrated circuit (chip) implementing the access point component of a wireline communications circuit, referred to herein as the access point chip 110, and a chip that may implement either the access point or the station component, referred to as the multi-mode chip 310.

The method of operating the access point 100 in the wireline communications circuit 10 includes steps: Generate a beacon 300 and schedule 303 with a transmitter complying with a wireless protocol to synchronize at least one station 200 acting as a client to the access point thereby initiating the time division multiple access sequence of uplink frames 304 and downlink frames 308 in the wireline communications circuit for one channel 330 allocated to the access point. First move 350 ahead the frames in response to first determining during an uplink frame 304 whether no station in the wireline communications circuit wants to transmit uplink frames and signaling all other access points that the uplink transmission phase is complete and receiving a signal from all other access points that their uplink transmission phase is complete. And second move 352 ahead the frames in response to second determining during a downlink frame 308 that there are no frames for transmission to any stations and signaling to all other access points that the uplink data transfer phase is complete and receiving a signal from all other access points that all the uplink data transfer phases are complete.

The method of operating the station 200 in the wireline communications circuit 10 includes the following steps: Receive the beacon 300 and the schedule 303 establishing the uplink frames 304 and downlink frames 308 preferably on one channel 330. First, transmit a 'Relinquish frame' if the station has no frames to transmit. Second, move 350 ahead the frames in response to third determining that the schedule 303 has changed because another station has sent a relinquish frame.

Embodiments of the invention include an integrated circuit (chip) implementing the access point 100 component of the wireline communications circuit 10 and a chip that may implement either the access point or the station component.

Figure 8:
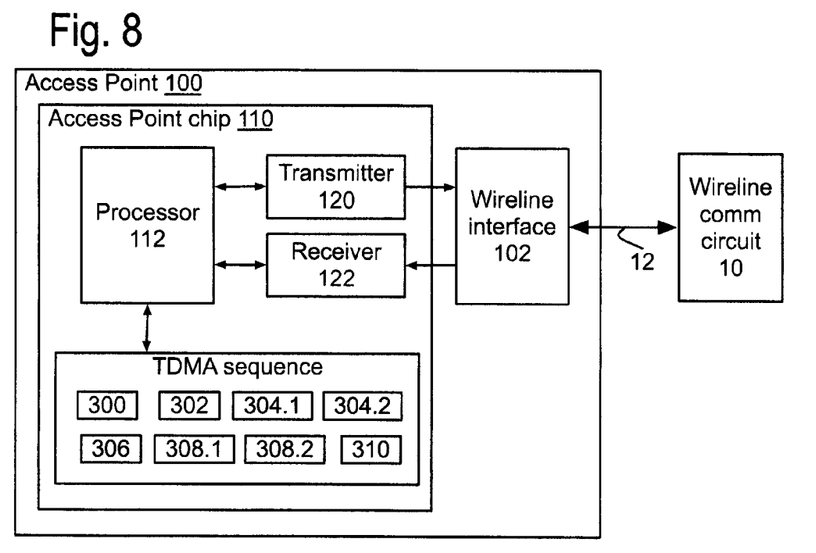
FIG. 8 shows some details of the access point of FIG. 1 including an access point chip in accord with the invention.

FIG. 8 shows a simplified block diagram of an example of the access point 100 including a chip referred to herein as an access point chip 110, which includes a transmitter 120 and a receiver 122 compatible with the wireless protocol and a first processor 112 controllably coupled to the transmitter 120 and to the receiver 122. The access point chip 110 operates as follows: the first processor restarts/starts up by asserting the synchronization ready signal, waiting for the synchronization start signal 150 to be asserted, then transmits and receives at least one of the adaptive TDMA cycles of FIGS. 3A and 3B transmitting and receiving the adaptive TDMA cycle includes the following: The first processor 112 directs the transmitter 120 to send the beacon 300 and the schedule 303 on the wireline medium 12 initiating the time division multiple access sequence of uplink frames 304 and downlink frames 308. The access point 100 begins receiving uplink frames 304 from stations. The first processor 112 receives a signal from all other access points that their uplink transmission phase is complete. Then the first processor 112 first moves 350 ahead the frames in response to first determining during an uplink frame that at least one other station in the wireline communication circuit 10 does not have data to provide in an uplink frame 304. The first processor 112 signals all other access points that the uplink transmission phase is complete. The first processor 112 begins to transmit downlink frames 308. The first processor 112 determines that its downlink data transfer phase is complete. The first processor 112 then signals all other access points that the downlink data transfer phase is complete. The processor receives a signal from all other access points that their downlink data transfer phase is complete. The processor second moves 352 ahead the frames in response to the second determining during a downlink frame that no station can download.

The transmitter 120 and the receiver 122 may interact with a wireline interface 102 to affect and sense the state of the wireline medium 12, thereby affecting and sensing the state of the wireline communications circuit 10. The wireline medium may be a coaxial cable, and the wireline interface may include a coaxial coupler. The wireline medium may be a fiber optic cable and the wireline interface may include a laser.

When the access point chip 110 operates with the TDMA sequence of FIG. 3A, it generates the beacon 300 and schedule 303, sends the downlink packets 308.1 and 308.2, and receives the uplink packets 304.1 and 304.2.

When the access point chip 110 operates with the TDMA sequence of FIG. 3B, it generates the beacon 300 and schedule 303, receives the uplink packets 304.1 and 304.2, sends the downlink packets 308.1 and 308.2.

Figure 9:
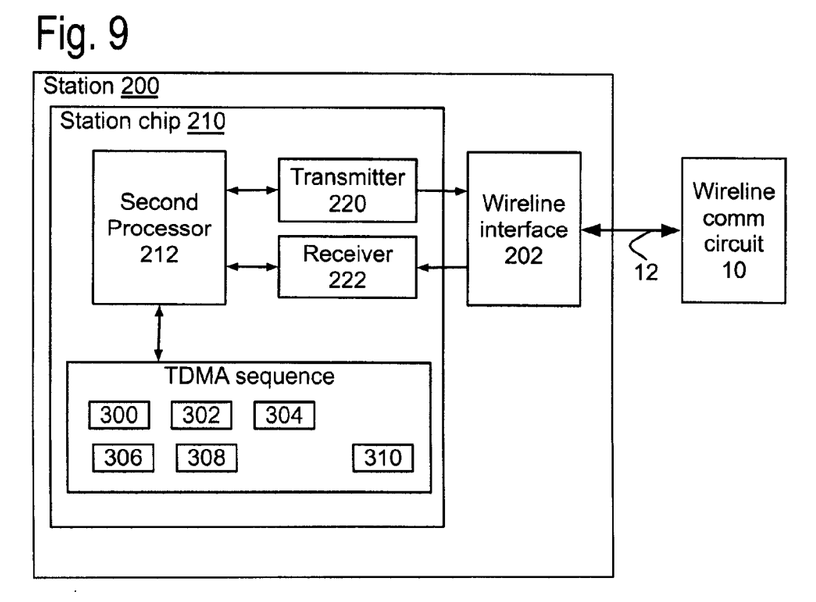
FIG. 9 shows some details of the station of FIG. 1 including a station chip in accord with the invention.

FIG. 9 shows a simplified block diagram of the station 200 including a chip referred to as the station chip 210, which includes a transmitter 220 and a receiver 222 compatible with a wireless protocol and a second processor 212 controllably coupled to the transmitter and to the receiver. The station chip operates as follows: The second processor directs the receiver to receive the beacon 300 and the schedule 303 establishing the uplink frames 304 and the downlink frames 308. The second processor 212 first sends a "relinquish frame" to indicate it does not wish to transmit its uplink frame. It moves 350 ahead the frames in response to third determining that another station has sent a "relinquish frame".

The transmitter 220 and the receiver 222 may interact with a wireline interface 202 to affect and sense the state of the wireline medium 12, thereby affecting and sensing the state of the wireline communications circuit 10. The wireline medium 12 may be a coaxial cable, and the wireline interface may include a coaxial coupler. The wireline medium 12 may be a fiber optic cable and the wireline interface may include a laser.

In further detail, the station chip 210 may include some of the components of the TDMA sequence of FIG. 3A or of FIG. 3B, in particular, it may receive the beacon 300 and schedule 303, send an uplink packet 304, receive a downlink packet 308, and. In other embodiments that will be described shortly, acknowledgement of a received download may be sent with the next upload in a scheduled uplink frame.

Figure 10:
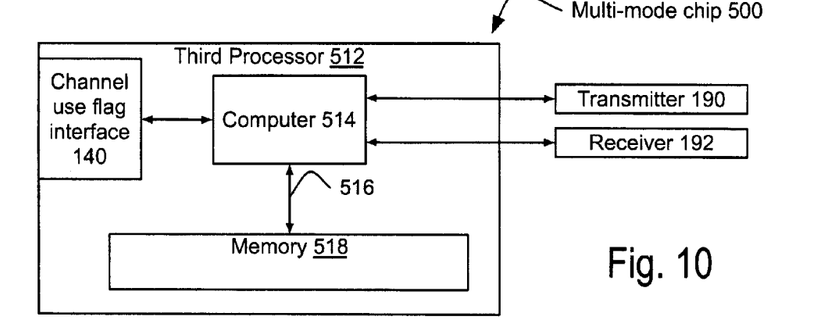
FIG. 10 shows an example of a chip, referred to herein as a multi-mode chip, that can be configured to operate the access point by installing a first program system as shown in FIG. 11 or to operate the station as shown in FIG. 12 by installing a second program system.
Figure 11:
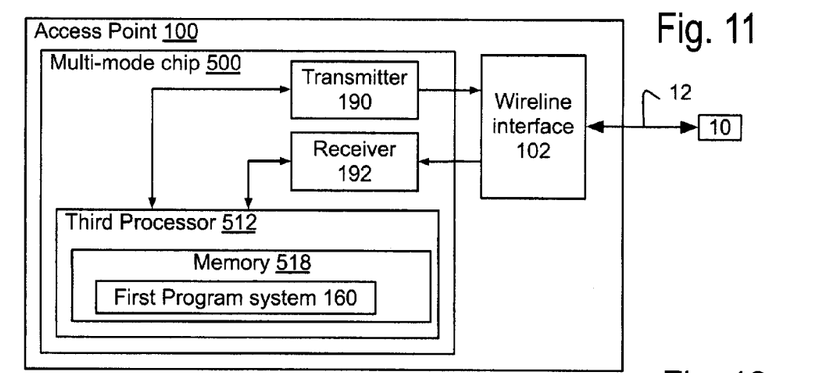
Figure 12:
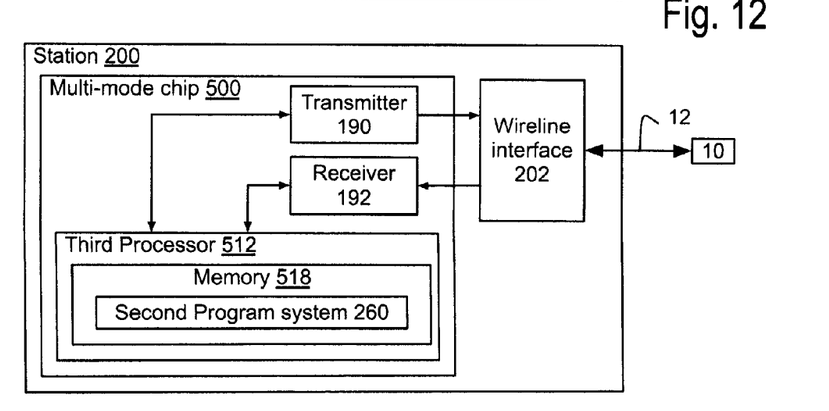

FIG. 10 shows a preferred embodiment of a chip known herein as a multi-mode chip 500 that can be configured to operate the access point 100 as shown in FIG. 11 in response to installation of a first program system 160 in a computer readable memory 518, or to operate the station 200 as shown in FIG. 12 in response to installation of a second program system 260 in the memory. The multi-mode chip may include at least one computer 514 accessibly coupled 516 to the computer readable memory and instructed to operate the transmitter 190 and receiver 192 based upon which program system has been installed. The transmitter and the receiver are compatible with the wireless protocol, and the third processor is controllably coupled to the transmitter and to the receiver.

As used herein, any computer includes at least one data processor and at least one instruction processor instructed by a program system, where each of the data processors is instructed by at least one of the instruction processors. While such embodiments are preferred as of the time of filing, the methods operating the access points 100 and stations 200 may also be implemented using at least one finite state machine. As used herein, a finite state machine receives at least one input, maintains and updates at least one state and generates at least one output based upon the value of at least one of the inputs and/or the value of at least one of the states.

Figure 13:
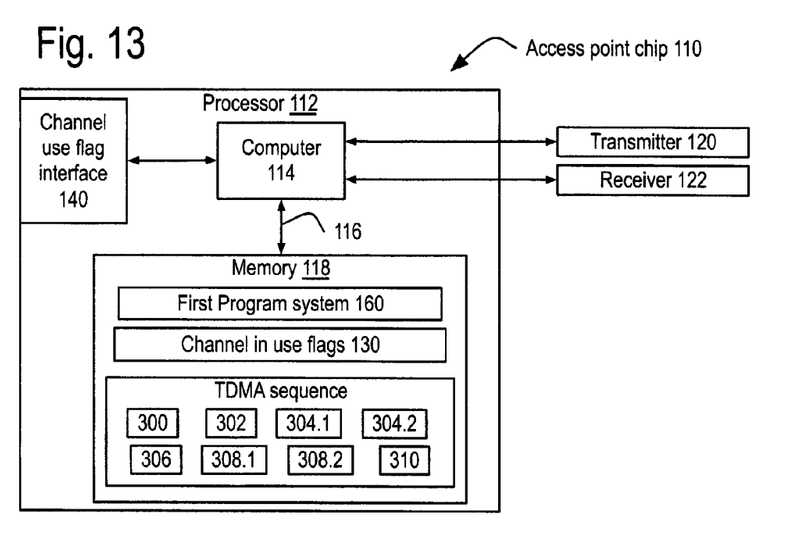
FIG. 13 shows some details of the access point chip of FIG. 8.

FIG. 13 shows a block diagram of some details of the access point chip 110 and its first processor 112, including a computer 114 accessibly coupled 116 to a computer readable memory 118 and instructed by a program system 160 including program steps residing in the memory. The memory may further include the TDMA sequence as described above based upon either FIG. 3A or 3B.

The access point chip 110 may further include one or both of a channel strength estimate 132 for each channel 330 and a set of channel in use flags 130. Certain embodiments of access point chip may include pins dedicated to communicating the channel in use flags between the access points 100. Other embodiments may derive the channel strength estimates from the receiver 122.

Figure 14A:
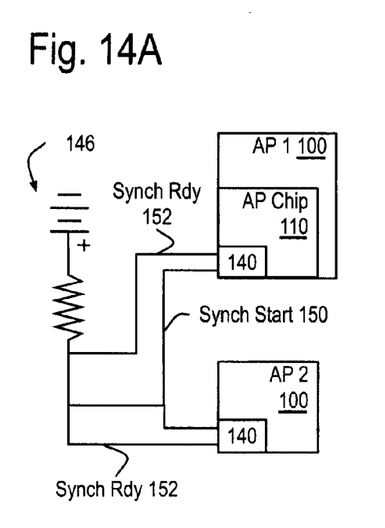
FIGS. 14A and 14B show a preferred embodiments with the synchronizing circuit communicatively coupled to each of the access points in the wireline communication circuit to generate the synchronization start signal.
Figure 14B:
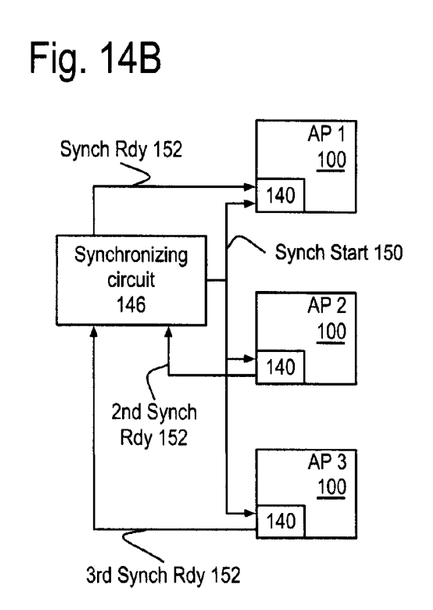

FIGS. 14A and 14B show a preferred embodiments with the synchronizing circuit communicatively coupled to each of the access points 100 in the wireline communication circuit 10 to generate the synchronization start signal 150. In FIG. 14A, the synchronizing circuit 146 may include a pullup resistor with each of the synchronization ready signals 152 being asserted as a high impedance state and when unasserted tied to a ground, preferably a shared ground. In FIG. 14B, the wireline communication circuit includes more than two access points, in particular three access points. Note that the multi-mode chip 500 when configured as an access point chip 110 may be similarly coupled and used. The sending and receiving of the use flags between the access points via the use flag coupling serves to notify each access point of the use of the channels other than their own. In certain embodiments, the use flag interface may serve to trigger an interrupt of the processor of the access point. The interrupt may be a non-maskable interrupt.

Some of the following figures show flowcharts of at least one embodiment of the invention's methods, which may include arrows signifying a flow of control, and sometimes data, supporting various implementations. These may include a program operation, or program thread, executing upon the computer or states of a finite state machine. Each of these program steps may at least partly support the operation to be performed. Other circuitry such as radio components, specialized encoders and/or decoders, memory management and so on may also be involved in performing the operation. The operation of starting a flowchart refers to entering a subroutine or a macro instruction sequence in the computer or of a possibly initial state or condition of the finite state machine. The operation of termination in a flowchart refers to completion of those operations, which may result in a subroutine return in the computer or possibly return the finite state machine to a previous condition or state. The operation of terminating a flowchart is denoted by a rounded box with the word "Exit" in it.

Figure 15A:
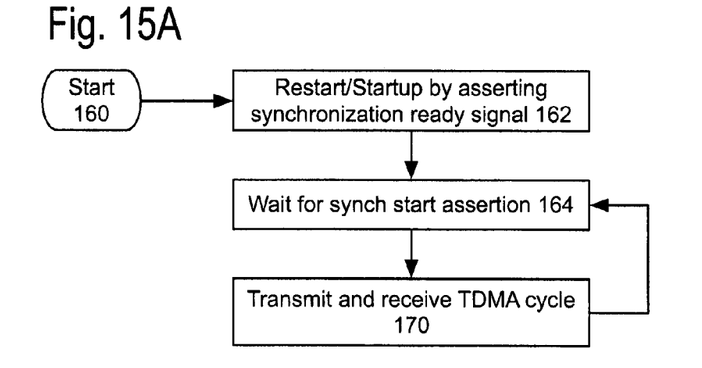
FIG. 15A shows an alternative approach to the state diagram of FIG. 2A as the first program system of FIGS. 11 and 13.

FIG. 15A shows some details of the first program system 160 of FIGS. 11 and 13 implementing the state diagram of FIG. 2A including the following program steps: Program step 162 restarts/starts up by asserting the synchronization ready signal 152. Program step 164 waits for the synchronization start signal 150 to be asserted. And program step 170 transmits and receives the adaptive TDMA cycle of FIG. 3A or 3B.

Figure 15B:
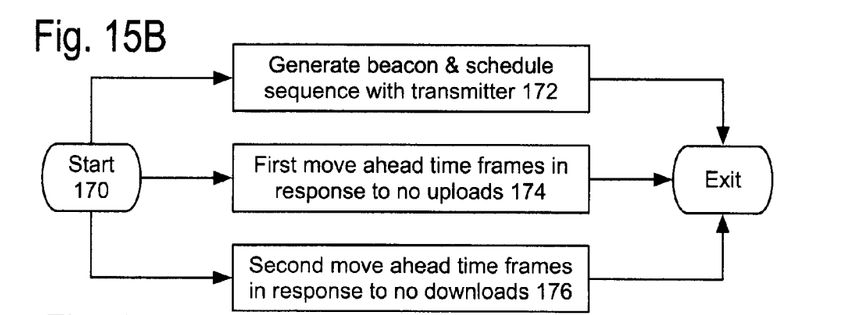
FIG. 15B shows some details of the transmission and reception of the adaptive TDMA cycle of FIG. 15A.

FIG. 15B shows some details of the program step 170 of FIG. 15 to transmit and receive the adaptive TMDA cycle including the following program steps: Program step 172 generates the beacon 300 and the schedule 303 with the transmitter complying with the wireless protocol thereby initiating the time division multiple access sequence of uplink frames 304 and downlink frames 308 in the wireline communications circuit for one channel 330 allocated to the access point 100 including the access point chip 110. Program step 174 first moves 350 ahead the frames in response to first determining during an uplink frame 304 whether no station in the wireline communications circuit can upload by signaling the processors on all other access points that the uplink transmission phase is complete and receiving a signal from all other access points that their uplink transmission phase is complete. Program step 176 second moves 352 ahead the frames in response to second determining that its downlink data transfer phase is complete by signaling all other access points that the downlink data transfer phase is complete and receiving a signal from all other access points that their downlink data transfer phase is complete.

Figure 16:
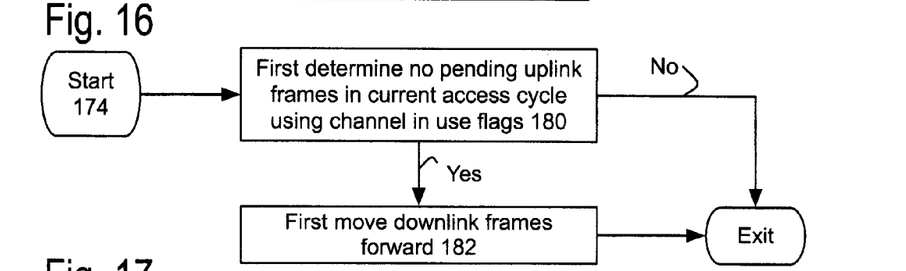
FIGS. 16 and 17 shows some details of the moving ahead of the time frames for uploads and downloads.

FIG. 16 shows some details of program step 174 of FIG. 15B, including the program step 180 first determines there is no pending uplink frames in the current access cycle using the channel in use flags 130 that may be accessed by the computer 114 through the channel use flag interface 140. Program step 182 is executed when this determination is yes, otherwise this program step is exited. Program step 186 first moves downlink frames forward in response to the first determination being yes.

Figure 17:
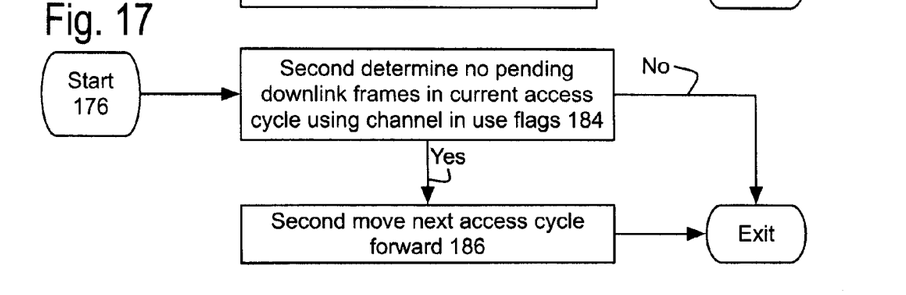

FIG. 17 shows some details of the program step 176 of FIG. 15B, including the program step 184, which second determines that there is no pending downlink frames in the current access cycle using the channel in use flags 130 that may be accessed by the computer 114 through the channel use flag interface 140. Program step 186 is executed when this determination is yes, otherwise this program step is exited. Program step 186 second moves the next access cycle forward in response to the second determination being yes.

Figure 18:
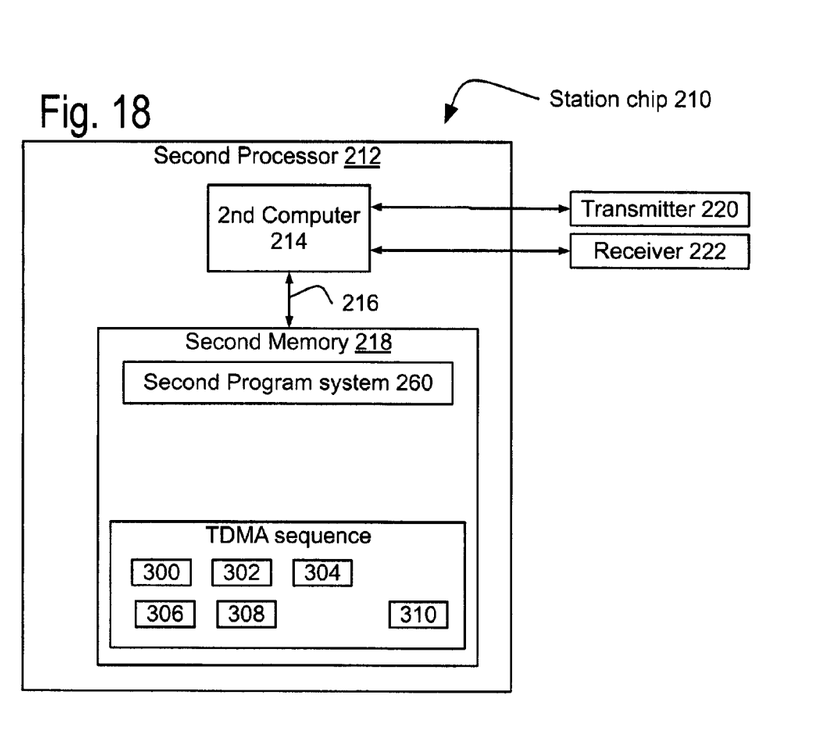
FIGS. 18 and 19 show some details of the station chip of FIG. 9 and the second program system of FIG. 12.

FIG. 18 shows a simplified block diagram of the station chip 210 of FIG. 9 with its second processor 212 further including a second computer 214 second accessibly coupled 216 to a second computer readable memory 218. The second memory includes a second program system 260 to implement the operation of the station 200 as previously discussed. The second memory may further include channel strength estimates 232 similar to the channel strength estimates 132 described for the access point chip 112 of FIG. 12. The second memory may also include at least part of the TDMA sequence as discussed above with regards FIG. 9.

Figure 19:
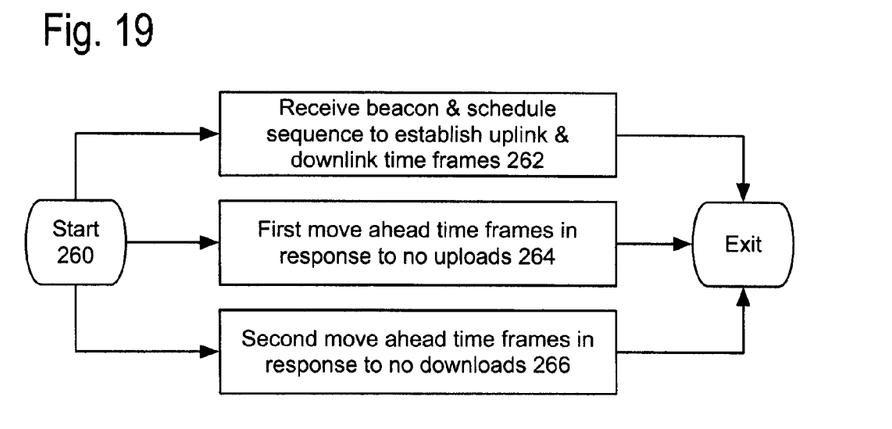

FIG. 19 shows a flowchart of the second program system 260 that may implement the method of operating the station 200 by including the program steps: Program step 262 receives the beacon 300 and the schedule 303 establishing the uplink frames 304 and the downlink frames 308. Program step 264 first moves 350 ahead the frames in response to third determining that there are no active uploads in an uplink frame. And program step 266 second moves 352 ahead the frames in response to fourth determining that there are no active downloads in a downlink frame.

Program step 264 may preferably be implemented in a similar fashion to program step 164 as shown in FIG. 15 and program step 266 may be implemented similarly to program step 166 in FIG. 16.

Further preferred refinements will now be discussed that incorporate a reservation phase in the TDMA frame sequence, and/or bundle acknowledgements by the access points and stations for their previously received frame when they next transmit, and/or the relinquishment of the remainder of an uplink frame by a station.

Figure 20:
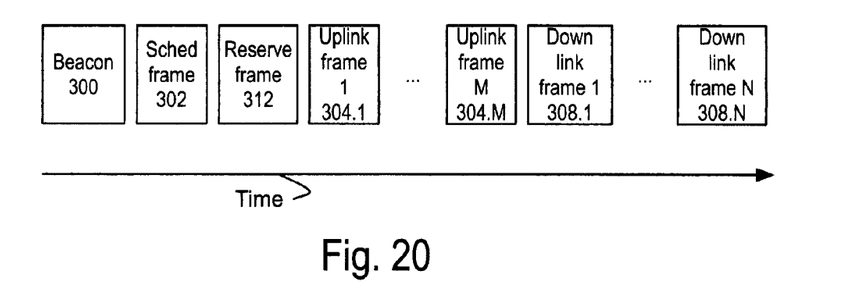
FIGS. 20 to 22 show a refinement of the TDMA scheme of FIG. 3B, removing separate acknowledgement frames, adding a reservation frame and incorporating the use a relinquish message in at least some uploads.

FIG. 20 shows a preferred refinement of the TDMA protocol sequence shown in FIG. 3 without separate acknowledgement frames, and further includes a reservation frame 312. In certain embodiments, the beacon 300 and the schedule 303 may be treated as a single frame. The reservation frame may serve to permit the stations 200 to request reservation of uplink frames 304 from an access point 100.

Figure 21:
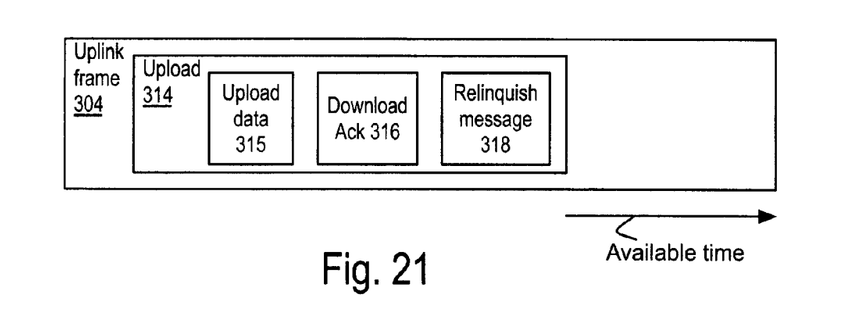

FIG. 21 shows a preferred embodiment of an upload 314 from a station 200 within one of the uplink frames 304, including one or more of an upload data 315, a download acknowledgement 316 of a previously received download from the access point 100, and/or a relinquish message telling the other stations using the access point that the remaining time in the uplink frame is not needed. The upload data may be at least one packet as a data payload and may include error control coding fields.

Figure 22:
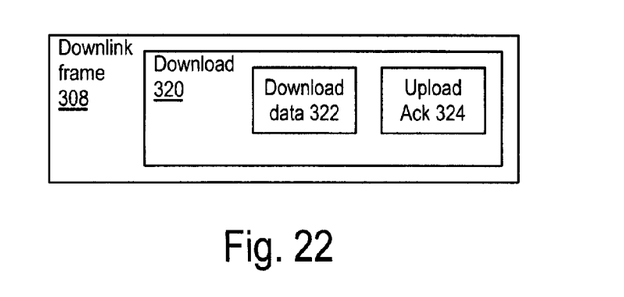

FIG. 22 shows a preferred embodiment of a download 320 from an access point 100 to a station 200 that may include download data 322 and/or an acknowledgement 324 of an upload previously received from the station.

Figure 23:
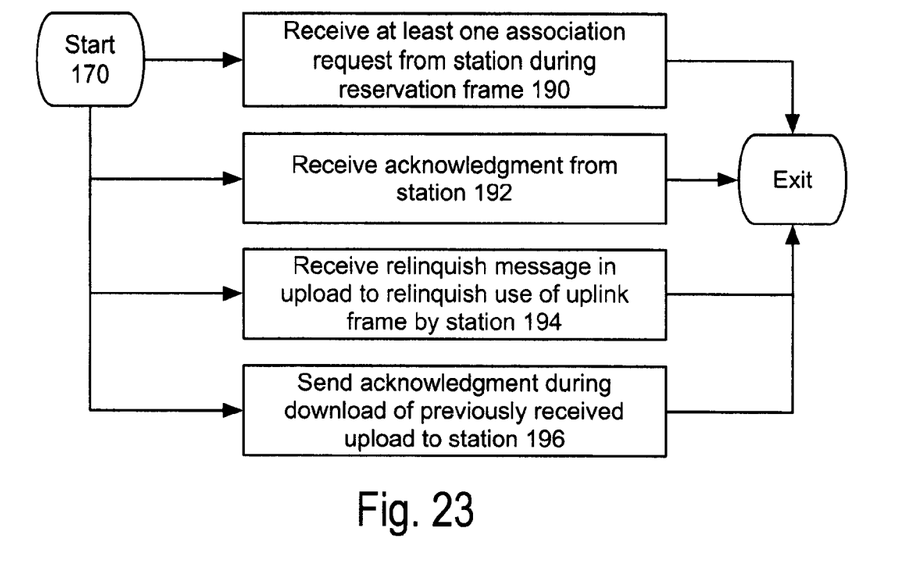
FIG. 23 shows through the example of the first program system how the method of operating the access point may address these refinements to the TDMA protocol shown in FIGS. 20 to 22.

FIG. 23 shows through the example of the program step 170 how the method of operating the access point 100 may address these refinements to the TDMA protocol shown in FIGS. 20 to 22. Program step 190 directs the receiver 122 or 192 to receive at least one association request from a station 200 during the reservation frame 312. Program step 192 receives an acknowledgement 316 from the station as part of an upload 314. The acknowledgement is of a download 310 previously sent from the access point and received by the station 200. Program step 194 receives a relinquish message from the station to relinquish the rest of the uplink frame 304, freeing up most if not all of its available time. In many embodiments, the channel in use flag interface is directed to assert a pin, which is combined through logical operation with at least one other access point to create a global in-use flag that is made available by the channel in use flag interface 140, frequently as a non-maskable interrupt to the computer 114 or 514. And program step 196 directs the transmitter 120 or 190 to send an acknowledgement 324 of a previously received upload 314 by the station 200.

Figure 24:
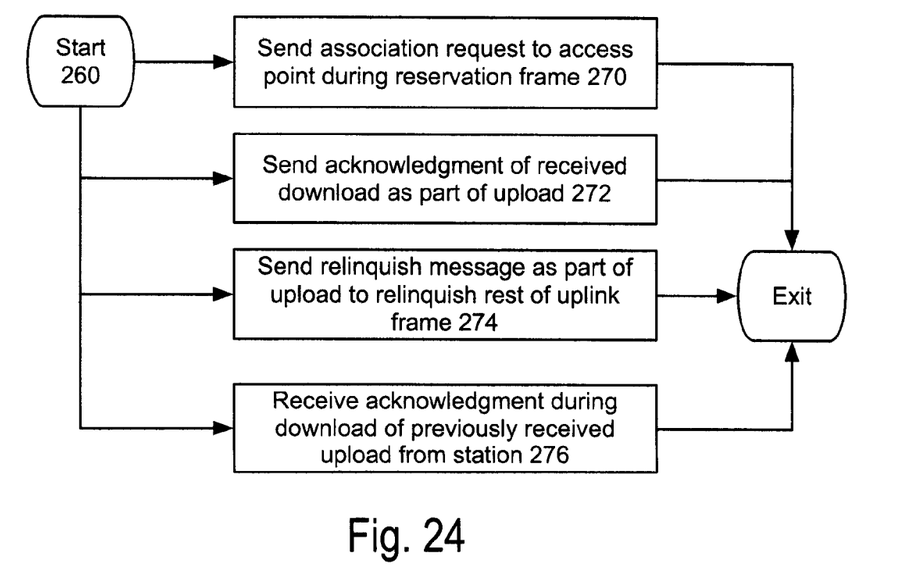
FIG. 24 shows through the example of the second program system how the method of operating the station may address these refinements to the TDMA protocol shown in FIGS. 20 to 22.

FIG. 24 shows through the example of the second program system 260 how the method of operating the station 200 may address these refinements to the TDMA protocol shown in FIGS. 20 to 22. Program step 270 directs the transmitter 220 or 190 to send receive at least one association request from a station 200 during the reservation frame 312. Program step 172 receives an acknowledgement 316 from the station as part of an upload 314. The acknowledgement is of a download 310 previously sent from the access point and received by the station 200. Program step 274 sends a relinquish message from the station to relinquish the rest of the uplink frame 304, freeing up most if not all of its available time. And program step 176 receives an acknowledgement 324 of a previously received upload 314 from the station 200.

The preceding embodiments provide examples of the invention, and are not meant to constrain the scope of the following claims.

What is claimed is:

1. An access point assembly, comprising:
    at least two access points, wherein each of the at least two access points comprise a transmitter and a receiver that are compliant to a wireless protocol for use with a wireline medium; and
    a synchronizing circuit coupled with each of said the at least two access points to receive a synchronization ready signal and to generate a synchronization start signal sent to each of said the at least two access points wherein:
    said synchronizing circuit configured to respond to an assertion of each of said synchronization ready signals by asserting said synchronization start signal;
    the at least two access points configured to execute an adaptive Time Division Multiple Access (TDMA) protocol using said transmitter and said receiver in response to said assertion of said synchronization start signal, wherein execution of said adaptive TDMA protocol comprises directing said transmitter to send a beacon and a schedule on said wireline medium to initiate a time division multiple access sequence of uplink frames and downlink frames, signaling other access points and moving ahead said schedule in response to a first determination that one of said uplink frames needs no upload and signaling other access points and moving ahead said schedule in response to a second determination that one of said downlink frames needs no download.

2. The access point assembly of claim 1, wherein said synchronizing circuit is configured to respond to said assertion of each of said synchronization ready signals for a time period by asserting said synchronization start signal.

3. The access point assembly of claim 1, wherein said assertion of said synchronization ready signal is a high impedance state as opposed to a ground state; and said synchronization circuit includes a pullup resistor tied to each of said synchronization ready signals and to said synchronization start signal.

4. The access point assembly as in claim 1, wherein a distance between each of the at least two access points is less than five meters.

5. The method as in claim 1, wherein the synchronization ready signal is sent from each of the at least two access points.

6. A method comprising the step of operating a synchronizing circuit communicating with at least two access points including a transmitter and a receiver both that are compliant to a wireless protocol for use with a wireline medium, the method comprising:
    receiving a synchronization ready signal from each of said the at least two access points;
    asserting a synchronization start signal sent to each of said the at least two access points in response to said synchronizations ready signals being asserted, and
    triggering each of the at least two access points to execute an adaptive Time Division Multiple Access (TDMA) protocol using said transmitter and said receiver in response to said assertion of said synchronization start signal, wherein each of the at least two access points are collocated and wherein execution of said adaptive TDMA protocol comprises directing said transmitter to send a beacon and a schedule on said wireline medium to initiate a time division multiple access sequence of uplink frames and downlink frames, signaling other access points and moving ahead said schedule in response to a first determination that one of said uplink frames needs no upload and signaling other access points and moving ahead said schedule in response to a second determination that one of said downlink frames needs no download.

7. The method of claim 6, wherein said wireless protocol is a version of an IEEE 802.11 wireless communications protocol.

8. The method of claim 6, wherein said wireline medium is a form of coaxial cable.

9. The method of claim 6, further comprising:
    receiving a relinquish message to relinquish use of uplink frame, the relinquish message being sent by at least one station receiving the beacon and the schedule via said wireline medium.

10. The method of claim 6, wherein said synchronization start signal is asserted after said synchronization ready signals are asserted for a predetermined time period.

11. The method as in claim 6, wherein a distance between each of the at least two access points is less than five meters.

12. A method of operating an access point including a transmitter and a receiver both compliant to a wireless protocol for use with a wireline medium, the method comprising:
    asserting a synchronization ready signal;
    sensing an assertion of a synchronization start signal by a synchronization circuit in response to receiving the asserted synchronization ready signal; and
    executing an adaptive Time Division Multiple Access (TDMA) protocol using the transmitter and receiver in response to said assertion of said synchronization start signal, wherein the executing comprises directing said transmitter to send a beacon and a schedule on said wireline medium to initiate a time division multiple access sequence of uplink frames and downlink frames, signaling other access points and moving ahead said schedule in response to a first determination that one of said uplink frames needs no upload and signaling other access points and moving ahead said schedule in response to a second determination that one of said downlink frames needs no download.

13. The method of claim 12, wherein said wireless protocol is a version of an IEEE 802.11 wireless communications protocol.

14. The method of claim 12, wherein said wireline medium is a form of coaxial cable.

15. The method of claim 12, further comprising the step of:
receiving a relinquish message to relinquish use of uplink frame, the relinquish message being sent by at least one station receiving the beacon and the schedule via said wireline medium.

16. A chip for operating an access point, comprising:
a transmitter and a receiver both compliant to a wireless protocol for use with a wireline medium; and
a processor coupled to said transmitter and to said receiver, wherein said processor configured to:
assert a synchronization ready signal and sense an assertion of a synchronization start signal by a synchronization circuit in response to receiving the asserted synchronization ready signal;
start and restart by asserting said synchronization ready signal; and
direct said transmitter to send a beacon and a schedule on said wireline medium to initiate a time division multiple access sequence of uplink frames and downlink frames in response to said assertion of said synchronization start signal, wherein said processor is further configured to signal other access points and to move ahead said schedule in response to a first determination that one of said uplink frames needs no uploads and wherein said processor is further configured to signal other access points and to move ahead said schedule in response to a second determination that one of said downlink frames needs no download.

17. The chip of claim 16, wherein said wireless protocol is a version of an IEEE 802.11 wireless communications protocol.

18. The chip of claim 16, wherein said wireline medium is a form of coaxial cable.

19. The chip of claim 16, wherein said wireline medium is a form of a member of group consisting of a fiber optic cable and a twisted pair cable.

* * * * *